Figure 1:
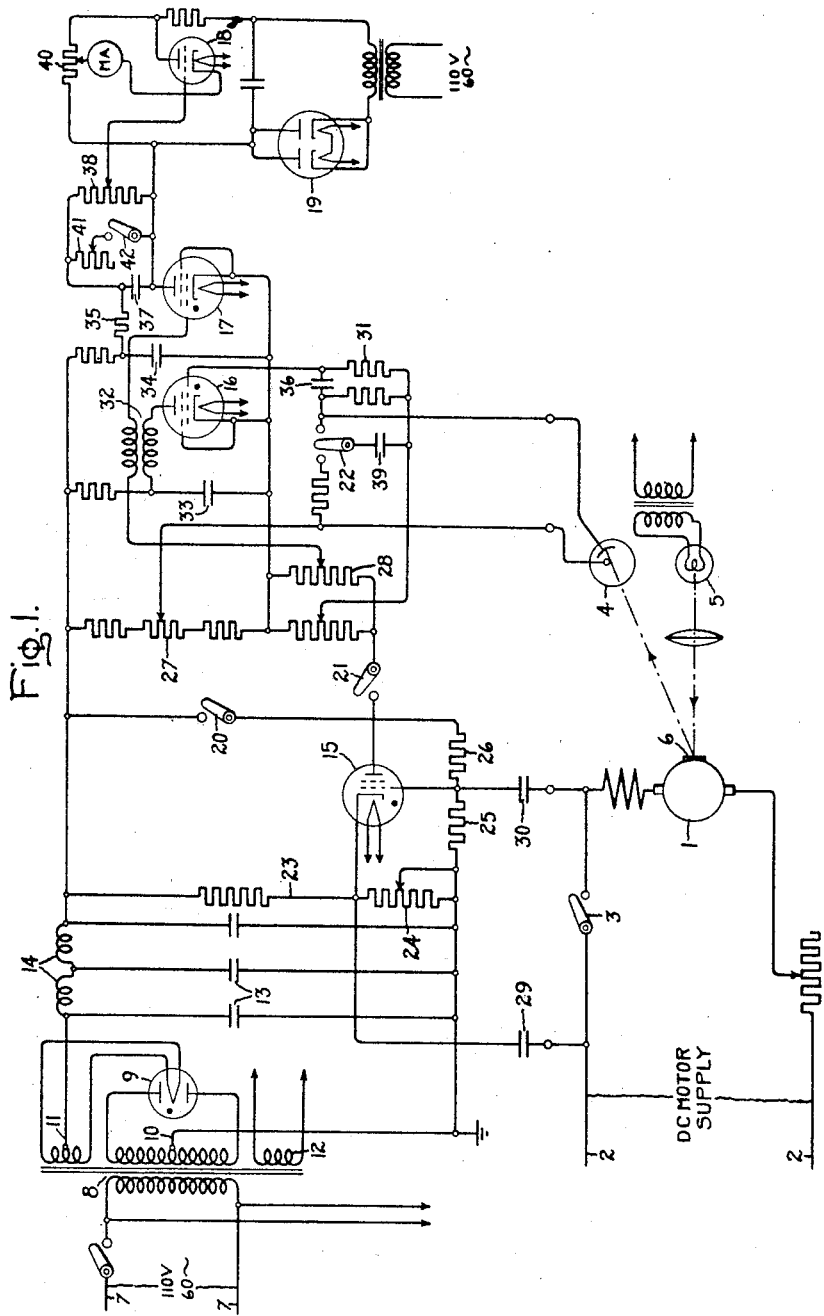

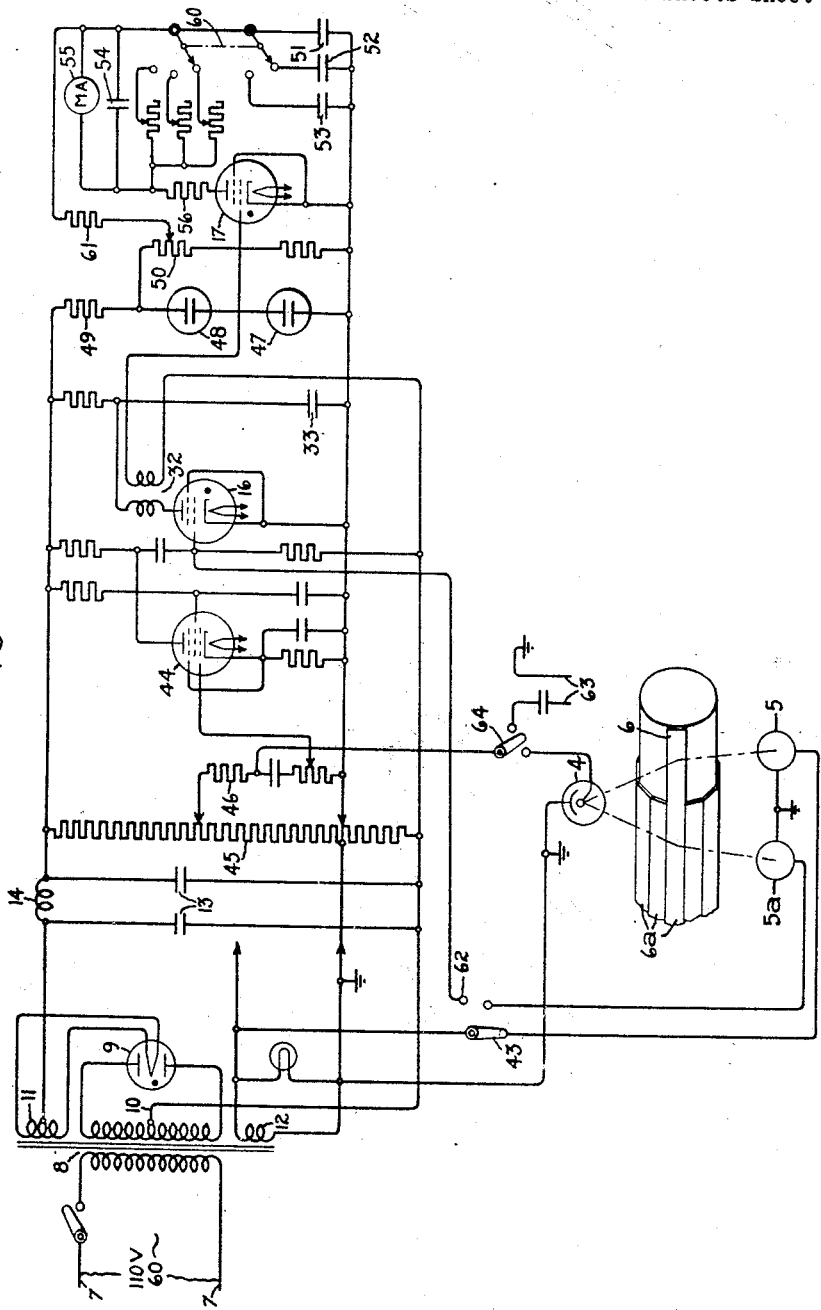

Patented Feb. 24, 1948

2,436,637

UNITED STATES PATENT OFFICE 2,436,637

ELECTRONIC COUNTER DEVICE

Emerson G. Downie, Fort Wayne, Ind., assignor to General Electric Company, a corporation of New York Application February 1, 1945, Serial No. 575,688

3 Claims. (Cl. 235—92)

1

My invention relates to electronic counter devices such as may be used for counting at high speed, measuring speed and frequency, and the like. The same apparatus may be used, for example, for counting the number of revolutions of a shaft during a given operation or period of time and also for measuring the speed of rotation of the shaft.

The features of my invention which are believed to be novel and patentable will be pointed out in the claims appended hereto. For a better understanding of my invention, reference is made in the following description to the accompanying drawings in which Fig. 1 represents a wiring diagram of my invention as used for measuring the number of revolutions of a motor during a stopping operation, and Fig. 2 represents a wiring diagram of my invention primarily for use in measuring speed and frequency.

Certain small electric motors are equipped with magnetic brakes which become effective when the motor is deenergized to stop the motor within a few revolutions from speeds of the order of 19,000 R. P. M. in a small fraction of a second. In Fig. 1, my invention is used for counting the number of revolutions of such a motor following the opening of its energizing circuit without adding inertia to the motor armature. This information is useful for brake test purposes. In Fig. 1, such a motor is represented at 1. Its source of supply is represented at 2 and its energizing and stopping switch is indicated at 3. Four (4) represents a photoelectric cell to which light from a source 5 is reflected by a mirror 6 on some rotating part of the motor once per revolution. The mirror 6 may be simply a polished spot on one side of the motor shaft. The number of light impulses striking the photocell 4 following the opening of switch 3 are counted, and the count is obtained in the form of a voltmeter reading by means of the electronic circuit now to be described.

It may be stated that because of the high speed rate involved at the beginning of a stopping operation and the short time stopping interval involved, a mechanical counter cannot be used and, moreover, would add inertia to the shaft and cause error in the test data obtained.

The power supply for the electronic circuit may comprise a 60-cycle alternating current source 7, transformer 8, and a full wave electronic rectifier tube 9. The direct current voltage obtained is taken from the midpoint 10 of the main secondary of the transformer and the midpoint 11 of a low voltage secondary winding of the transformer comprising the heating circuit of the cathode of

2 tube 9. Point 10 is shown connected to ground. The transformer 8 may also have a low voltage winding 12 for supplying heating current for cathodes of other electronic tubes of the circuit. Condensers 13 and reactances 14 are provided for filtering and smoothing the rectified voltage. The electronic tubes employed are a count initiating tube 15 which acts as a high speed relay or switch, counting tubes 16 and 17, and a vacuum tube voltmeter tube 18 supplied by its own rectifier tube 19. The rectifier tubes and tubes 15, 16, and 17 are of the gaseous type. The circuit includes various resistances, condensers, switches, etc., connected as represented, and the purpose thereof will be evident or will be mentioned in connection with the explanation of the operation of the circuit which follows.

Assume the switch 3 is closed so that the motor 1 is in operation. Also that light source 5 and the power supply for the electronic circuit are energized. That the switch shown at 21 is closed, and the switch at 22 is open or closed to the left. Under these conditions, tube 15 does not pass current because its grid is biased negative relative to the cathode by reason of their connection to suitable voltage divider resistance circuits 23, 24, 25 connected across or to the direct current supply. The tube 15, when it fires, controls the voltage across a voltage divider circuit, including suitable resistances 27 and 28. However, when tube 15 is cut off, no voltage is impressed upon the voltage divider circuit 27—28 and counter circuit tubes 16 and 17, so that these tubes are cut off even though light impulses are being received on the photocell 4 which serves to trigger tube 16 when such tube is supplied with voltage.

The cathode grid circuit of tube 15 is connected across the motor line switch 3 through condensers 29 and 30, such that when the switch 3 is opened to deenergize the motor, the voltage which appears across its contacts is transmitted to the grid of tube 15 which is thus caused to fire and applies voltage across the voltage divider circuit 27—28 and tubes 16 and 17. In the absence of impulses from the photocell 4, tubes 16 and 17 do not conduct because the grid of tube 16 is held negative through a resistance 31, and the grid of tube 17 is held negative by a connection to resistance 28 through the secondary coil of an air core transformer 32. A condenser 33 is connected across tube 16, and a condenser 34 is connected across tube 17 through a resistance 35, so that as soon as tube 15 fires to apply voltage across tubes 16 and 17, these condensers charge substantially instantaneously and reach over 99 per cent of full charge during the time of one revolution of motor 1 when it is running at the highest speed to be used.

In order to use a practicable example, it will be assumed that the maximum full speed of motor 1 is 19,000 R. P. M., that it stops in the order of eight revolutions after its switch 3 is opened, and that the stopping time is of the order of 0.04 second. For such an application condenser 33 will receive 99.75 per cent of full charge in 0.003 second, and condenser 34 will receive 99.94 per cent of full charge in 0.003 second, for example.

The first impulse from photocell 4 which occurs after voltage is applied to tube 16 causes tube 16 to fire because, in effect, such impulse connects the grid of tube 16 to a point along voltage divider resistance 27 which is more positive than the cathode of tube 16, such connection being through a resistance shunted condenser 36. The firing of tube 16 causes condenser 33 to discharge through the tube and the primary of the transformer 32. At the end of the discharge the current drops low enough to extinguish tube 16, and condenser 33 starts to recharge. The voltage induced in the secondary of transformer 32 by the current of a full voltage discharge of condenser 33 through the primary is sufficient to swing the grid of tube 17 positive and cause it to discharge the charge on condenser 34 through resistance 35 into a condenser 37 which is much larger than 34. The grid firing surge on tube 17 is of such short duration that the tube cannot restrike. The above-described operation of tubes 16 and 17 reoccurs for each revolution of the motor. Hence, there is built up on condenser 37 a voltage proportional to the number of revolutions being counted, and this charge is measured by the vacuum tube voltmeter in terms of the number of revolutions. Of course, as condenser 37 charges up, it accepts less charge each time from condenser 34 but since condenser 37 is large in comparison to 34 and the vacuum tube voltmeter is capable of accurately measuring small voltages, this effect is negligible and in any case is taken care of in the calibration. The discharge of condenser 37 through the voltage divider resistance 38 of the vacuum tube voltmeter circuit is sufficiently slow that accurate readings of the maximum voltage of condenser 37 may be obtained without hurrying.

The apparatus may be calibrated by rotating the motor by hand back and forth past the point where the photocell is flashed, and counting the flashes and comparing such number with the voltmeter reading. However, for greater convenience a calibrating switch 22 is provided. By closing switch 22 to the left, a condenser 39 receives a charge and then throwing the switch to the right, this charge is transmitted to the grid of tube 16 to trip the same. This may be repeated as many times as desired, each operation being equivalent to one motor revolution and one photocell impulse. With the conditions as previously specified, the motor speed must exceed 32,600 R. P. M. before the charge reached by condenser 34 during the fastest revolution drops below one per cent of full charge. The lower limit of revolution response is determined by the speed of photocell impulses which will pass through the condenser 36. As designed for the example given, this may be of the order of 60 R. P. M.

The vacuum tube voltmeter circuit has a zero adjustment potentiometer 40 and a sensitivity potentiometer adjustment along resistance 38. Using a condenser at 37 of 7½ microfarads and a condenser at 34 of 0.02 microfarad, the charge delivered to condenser 37 per revolution is approximately one volt using a 110-volt supply at 7. The resistance at 38 should be as high as practicable to reduce drain on condenser 37 during a reading. A 10,000,000-ohm resistor is satisfactory. The vacuum tube voltmeter circuit should be isolated or have no return circuit connection with the electronic circuit supplied through transformer 8, because neither side of condenser 37 is at ground potential.

It will be noted that I have provided an adjustable resistance 41 and a switch 42 across condenser 37. For use as a revolution counter, as previously described, the switch 42 is open. With switch 42 closed, the apparatus may be used as a tachometer or frequency meter, because then the charge on condenser 37 builds up until the current leak through resistance 41 equals the incoming current through resistance 35, and is proportional to the incoming pulse rate. The vacuum tube voltmeter may then be calibrated and used to read the motor speed before the break test, for example. Resistance 41 may be adjusted to give any desired tachometer calibration. It has no effect upon counter calibration. Preferably, however, the tachometer calibration should be such that the tachometer voltages across condenser 37 are low to give linearity of response. When using the apparatus as a tachometer, switch 20 is closed. The closing of switch 20 biases the grid of tube 15 through resistor 26, so that it passes current when motor switch 3 is closed. To stop the tachometer operation, switch 21 is opened. To then condition the apparatus for use as a counter as first described, switch 20 is opened and switch 21 is closed.

In Fig. 2, I have shown the application of my invention for use as a wide range, high accuracy tachometer and frequency meter. The power supply is essentially the same as that of Fig. 1, and indicated by like reference characters, and need not be explained further. The high speed relay tube 15 of Fig. 1 is omitted in Fig. 2 since it is not essential when only tachometer operation is involved. Lamp 5, mirror 6, and photocell 4 correspond to those of like number of Fig. 1, and the shaft on which mirror 6 is mounted may be that of any rotating element, the speed of which is to be measured. As represented in Fig. 2, the photocell may receive one light impulse per revolution when lamp 5 is used. However, a second lamp 5a and a 10-section mirror 6a may also be used to increase the photocell impulse rate to ten per revolution for lower speed measurements. A selector switch 43 is provided in the lamp energizing circuits to switch from one to the other. In the position shown, lamp 5 is selected so that as the shaft rotates, one impulse will strike the photocell for each revolution of the shaft. The photocell and lamp circuits are energized from the electronic power supply as represented.

In order to reduce the amount of light required and to render less exacting the light ray system, I have arranged to amplify the impulses from the photocell by an amplifier tube represented at 44. Tube 44 is normally biased to cutoff but when an impulse from the photocell is injected into its grid bias connection, tube 44 fires and, in turn, fires tube 16. The essential difference between this arrangement and that used in Fig. 1 is that the amplifier tube 44 is interposed between the photocell and the trigger grid control of tube 16. The voltage divider resistance circuits shown at 45 and 46 are used to obtain the proper voltage relations for the photocell and the grid bias of amplifier tube 44. These voltages are adjustable and include sensitivity control for the amplifier tube. As in Fig. 1, the tube 16 fires in response to a photocell impulse to discharge condenser 33 through the primary of the air core transformer 32 which, in turn, triggers tube 17 if the triggering impulse corresponds to the full discharge current of condenser 33.

In order that the speed measurements may be independent of variation in the supply voltage, the voltage supplied to tube 17 and its condenser charging circuit is maintained very constant by the use of voltage regulator tubes 47 and 48 which are connected across the direct current supply from rectifier 9 through a resistance 49. The supply voltage for tube 17 is then taken off from a resistance 50 circuit in shunt to the tubes 47 and 48, and is adjustable as indicated. In order to give a practicable example, the voltage across tubes 47 and 48 may be 300 volts and that supplied to the circuit of tube 17 may be adjusted from 250 to 300 volts.

The condenser and metering circuit associated with tube 17 is somewhat different from that of Fig. 1 and, in order to give a practicable example, I will specify certain values of capacity for the various condensers shown which have been found satisfactory, but the invention is not intended to be limited in this respect. Condenser 51 which is always connected across the regulated supply voltage charging circuit has a capacity of 0.005 microfarad; condenser 52 which may be connected in parallel with 51 has a capacity of 0.02 microfarad; condenser 53 which may be connected in parallel with condenser 51 has a capacity of 0.007 microfarad; condenser 54 which is in shunt to a milliammeter 55 has a capacity of 100 microfarads and may be an electrolytic condenser. The parallel connected elements 54 and 55 are connected between the high side of the regulated supply voltage and the plate of tube 17 through a resistance 56. A switch 60 is provided for modifying the circuit connections of condensers 51, 52, and 53 and is used for selecting the proper connection to be used for different speed ranges. The resistance 61 in the charging circuit may have a value of 30,000 ohms. The plate resistor 56 may be of the order of 100 ohms. The resistances which may be connected in shunt to instrument 55 are for calibration purposes.

The operation of the condenser measuring circuit is as follows: Condenser 51 alone, or condensers 51 and 52 in parallel, or condensers 51 and 53 in parallel are charged through resistance 61 when the tube 17 is cut off and are discharged when the tube fires. This capacitance corresponds to condenser 34, Fig. 1. The discharge current flows to a greater or less extent through the condenser 54 and milliammeter 55 in parallel, and the proportion of the discharge current which thus influences the meter 55 depends upon the position of switch 60 which connects different calibrating resistors in parallel with the instrument. Condenser 54 corresponds to condenser 37, Fig. 1.

The values of capacitances shown at 51, 52, and 53 give ranges in the ratio of 5, 2, and 1. For example, when condenser 51 is used alone, the connection is suitable for 50,000 impulses per second for full scale reading on instrument 55. When condensers 51 and 52 are used in parallel, the connection is for a 10,000 impulses per second range, and when condensers 51 and 53 are used in parallel, the connection is for a 20,000 per second impulse range. It is evident, then, that with this range adjustment controlled by switch 60 and the 10-to-1 range adjustment controlled by switch 43, a high accuracy tachometer combination becomes available for measuring speeds over a wide variety of ranges. This does not exhaust the speed range adjustment that may be had but is merely illustrative.

By moving the switch 43 to a calibration contact 62, impulses from the transformer winding 12 are impressed between the cathode and grid of tube 16, so that the frequency of the alternating current supply 7 may be used for calibration purposes. It is unnecessary to pass these calibration impulses through the amplifier tube 44. If a 60-cycle source is available as usual, the instrument at 55 and its associated circuits are thus calibrated at 3600 impulses per minute.

I may also switch the impulse input of tube 44 to an unknown frequency source 63 by a switch 64 and measure the frequency of the unknown impulse source. Such impulses may be either direct or alternating current. Where it is desired to employ the circuit of Fig. 2 as a counter circuit, the capacitance of condenser 54 will be changed to, say, 7.5 microfarads, so that it will charge up according to the number of impulses received.

What I claim as new and desire to secure by Letters Patent of the United States is:

1. An electronic impulse counter comprising a direct current source of supply, first and second capacitances, an electronic switch for connecting said capacitances in charging relation with said direct current source for substantially instantaneous charging, an impulse source, a normally nonconducting electron discharge device rendered conducting in response to said impulses for discharging the first capacitance, a normally nonconducting electron discharge device rendered conducting in response to the discharge surge of the first-mentioned capacitance for discharging the second-mentioned capacitance, a third capacitance larger than the second into which the second capacitance is discharged, a leakage discharge circuit for the third capacitance of sufficiently high impedance that a charge may be built up on the third capacitance which is proportional to the number of impulses received over a short period of time, an electronic voltmeter for measuring the charge on the third capacitance in terms of impulse count, and count start initiating means for effecting the closing of said electronic switch.

2. An electronic counter for counting the number of revolutions of an electric motor during a stopping operation comprising in combination with such motor and its stopping switch, a direct current source of supply, first and second capacitances, an electronic switch which is closed in response to the opening of the stopping switch of said motor for connecting said capacitances in charging relation with said source of supply for substantially instantaneous charging, means for producing an impulse for each revolution of the motor, a normally nonconducting electron discharge device for discharging the first capacitance in response to each such impulse, a second normally nonconducting electron discharge device for discharging the second-mentioned capacitance in response to the discharge surge of the first-mentioned capacitance, a third capacitance into which the second capacitance is discharged, said third capacitance being large in comparison to the second capacitance so that a charge may be built up thereon which is proportional to the number of impulses produced during stopping of the motor, an electronic voltmeter for measuring the charge on the third capacitance in terms of the number of revolutions of the motor during a stopping operation, means operative at will for causing the closing of said electronic switch when the motor stopping switch is in a closed condition, and a discharge circuit for said third capacitance which may be closed to render the charge on the third capacitance and the reading of said voltmeter proportional to the speed of said motor when in normal operation.

3. Electronic impulse measuring apparatus comprising a direct current source of supply, first and second capacitances adapted to be charged from said source substantially instantaneously, an impulse source, a normally nonconducting electron discharge device for discharging the first capacitance in response to such impulses, a normally nonconducting electron discharge device for discharging the second capacitance in response to the discharge surges of the first capacitance, a third capacitance larger than the second into which the second capacitance is discharged, an instrument for measuring the voltage across the third capacitance in terms of the impulse rate, said second capacitance being variable and said instrument and third capacitance having different calibrating resistances, and common switching means for varying the second capacitance and connecting selected calibrating resistances across the instrument to change the impulse rate measuring range of said apparatus.

EMERSON G. DOWNIE.

REFERENCES CITED

The following references are of record in the file of this patent:

UNITED STATES PATENTS

| Number | Name | Date |
|---|---|---|
| 1,995,890 | Lord | Mar. 26, 1935 |
| 2,078,792 | Fitzgerald | Apr. 27, 1937 |
| 2,113,011 | White | Apr. 5, 1938 |
| 2,122,464 | Golay | July 5, 1938 |
| 2,309,560 | Welty | Jan. 26, 1943 |
| 2,392,632 | Berry | Jan. 8, 1946 |